US006873952B1

(12) United States Patent
Bailey et al.

(10) Patent No.: US 6,873,952 B1
(45) Date of Patent: Mar. 29, 2005

(54) COARTICULATED CONCATENATED SPEECH

(75) Inventors: Scott J. Bailey, Scott's Valley, CA (US); Nikko Strom, Mountain View, CA (US)

(73) Assignee: Tellme Networks, Inc., Mountain View, CA (US)

( * ) Notice: Subject to any disclaimer, the term of this patent is extended or adjusted under 35 U.S.C. 154(b) by 0 days.

(21) Appl. No.: 10/439,739

(22) Filed: May 16, 2003

Related U.S. Application Data

(63) Continuation of application No. 09/638,263, filed on Aug. 11, 2000.
(60) Provisional application No. 60/383,155, filed on May 23, 2002.

(51) Int. Cl.[7] ................................................ G10L 15/04
(52) U.S. Cl. ....................................... 704/251; 704/254
(58) Field of Search ................................. 704/251, 254

(56) References Cited

U.S. PATENT DOCUMENTS 4,639,877 A * 1/1987 Raymond et al. ........... 704/258
5,704,007 A * 12/1997 Cecys ........................ 704/260
5,930,755 A * 7/1999 Cecys ........................ 704/260
6,163,765 A * 12/2000 Andric et al. ............... 704/204
6,175,821 B1 * 1/2001 Page et al. .................. 704/258
6,240,384 B1 * 5/2001 Kagoshima et al. ........ 704/220
6,470,316 B1 * 10/2002 Chihara ...................... 704/267
6,490,562 B1 * 12/2002 Kamai et al. ............... 704/258
6,591,240 B1 * 7/2003 Abe ........................... 704/278
2003/0147518 A1 8/2003 Albal et al. ............ 379/201.15

* cited by examiner

*Primary Examiner*—David Ometz
*Assistant Examiner*—Michael N. Opsasnick
(74) *Attorney, Agent, or Firm*—Wagner, Murabito, & Hao LLP

(57) ABSTRACT

Described are methods and systems for reducing the audible gap in concatenated recorded speech, resulting in more natural sounding speech in voice applications. The sound of concatenated, recorded speech is improved by also coarticulating the recorded speech. The resulting message is smooth, natural sounding and lifelike. Existing libraries of regularly recorded bulk prompts can be used by coarticulating the user interface prompt occurring just before the bulk prompt. Applications include phone-based applications as well as non-phone-based applications.

27 Claims, 8 Drawing Sheets

200

360

420

430

500

340

| MESSAGE NUMBER | PHONEME NUMBER |
|---|---|
| 1 | 1 |
| 1 | 2 |
| • • | • • |
| 1 | i |
| • • | • • |
| 1 | n |
| 2 | 1 |
| 2 | 2 |
| • • | • • |
| 2 | i |
| • • | • • |
| 2 | n |

330

| PRE-RECORDED SEGMENT NUMBER |
|---|
| SEGMENT 1 |
| SEGMENT 2 |
| SEGMENT 3 |
| SEGMENT 4 |
| SEGMENT 5 |
| SEGMENT 6 |
| SEGMENT 7 |
| • • • |
| SEGMENT n |

FIGURE 5

COARTICULATED CONCATENATED SPEECH

RELATED U.S. APPLICATIONS

This application claims priority to the copending provisional patent application Ser. No. 60/383,155, entitled "Coarticulated Concatenated Speech," with filing date May 23, 2002, assigned to the assignee of the present application, and hereby incorporated by reference in its entirety. The present application is a continuation-in-part of copending patent application Ser. No. 09/638,263 filed on Aug. 11, 2000, entitled "Method and System for Providing Menu and Other Services for an Information Processing System Using a Telephone or Other Audio Interface," by Lisa Stifelman et al., assigned to the assignee of the present application, and hereby incorporated by reference in its entirety.

BACKGROUND ART

1. Field of the Invention

Embodiments of the present invention pertain to voice applications. More specifically, embodiments of the present invention pertain to automatic speech synthesis.

2. Related Art

Conventionally, techniques used for computer-based or computer-generated speech fall into a couple of broad categories. One such category includes techniques commonly referred to as text-to-speech (TTS). With TTS, text is "read" by a computer system and converted to synthesized speech. A problem with TTS is that the voice synthesized by the computer system is mechanical sounding and consequently not very lifelike.

Another category of computer-based speech is commonly referred to as a voice response system. A voice response system overcomes the mechanical nature of TTS by first recording, using a human voice, all of the various speech segments (e.g., individual words and sentence fragments) that might be needed for a message, and then storing these segments in a library or database. The segments are pulled from the library or database and assembled (e.g., concatenated) into the message to be delivered. Because these segments are recorded using a human voice, the message is delivered in a more lifelike manner than TTS. However, while more lifelike, the message still may not sound totally natural because of the presence of small but audible gaps between the concatenated segments.

Thus, contemporary concatenated recorded speech sounds choppy and unnatural to a user of a voice application. Accordingly, methods and/or systems that more closely mimic actual human speech would be valuable.

DISCLOSURE OF THE INVENTION

Embodiments of the present invention pertain to methods and systems for reducing the audible gap in concatenated recorded speech, resulting in more natural sounding speech in voice applications.

In one embodiment, a voice message is repeatedly recorded for each of a number of different phonemes that can follow the voice message. These recordings are stored in a database, indexed by the message and by each individual phoneme. During playback, when the message is to be played before a particular word, the phoneme associated with that particular word is used to recall the proper recorded message from the database. The recorded message is then played just before the particular word with natural coarticulation and realistic intonation.

In one such embodiment, the present invention is directed to a method of rendering an audio signal that includes: identifying a word; identifying a phoneme corresponding to the word; based on the phoneme, selecting a particular voice segment of a plurality of stored and pre-recorded voice segments wherein the particular voice segment corresponds to the phoneme, wherein each of the plurality of stored and pre-recorded voice segments represents a respective audible rendition of a same word that was recorded from a respective utterance in which a respective phoneme is uttered just after the respective audible rendition of the same word; and playing the particular voice segment followed by an audible rendition of the word.

In another embodiment, a particular voice segment is selected using a database that includes the plurality of stored and pre-recorded voice segments, indexed based on the phoneme and based on the word. In one such embodiment, the voice segments are also pre-recorded at different pitches, and the database is also indexed according to the pitch. In yet another embodiment, a phoneme is identified using a database relating words to phonemes.

In summary, embodiments of the present invention improve the sound of concatenated, recorded speech by also coarticulating the recorded speech. The resulting message is smooth, natural sounding and lifelike. Existing libraries of regularly recorded messages, e.g., bulk prompts (such as names), can be used by coarticulating the user interface prompt occurring just before the bulk prompt. Embodiments of the present invention can be used for a variety of voice applications including phone-based applications as well as non-phone-based applications. These and other objects and advantages of the various embodiments of the present invention will become recognized by those of ordinary skill in the art after having read the following detailed description of the embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a representation of a database comprising messages, phonemes, and pre-recorded voice segments according to one embodiment of the present invention.

BEST MODE FOR CARRYING OUT THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "selecting," "playing," "receiving," "translating," "using," or the like, refer to the action and processes (e.g., flowchart 600 of FIG. 6) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Figure 1:
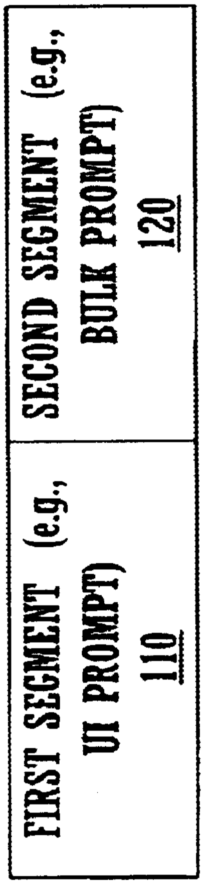
FIG. 1 illustrates the concatenation of speech segments according to one embodiment of the present invention.

FIG. 1 illustrates concatenation of speech segments according to one embodiment of the present invention. In this embodiment, a first segment 110 (e.g., a user interface prompt) is concatenated with a second segment 120 (e.g., a bulk prompt). Generally speaking, first segment 110 and second segment 120 can include individual words or sentence fragments that are typically used together in human speech. These words or sentence fragments are recorded in advance using a human voice and stored as audio modules in a library or database. The speech segments (e.g., audio modules) needed to form a message can be retrieved from the library and assembled (e.g., concatenated) into the message.

By way of example, first segment 110 may include a user interface prompt such as the word "Hi" and second segment 120 may include a bulk prompt such as a person's name (e.g., Britney). When segments 110 and 120 are concatenated, the audio phrase "Hi Britney" is generated.

According to the various embodiments of the present invention, segments 110 and 120 are also coarticulated to essentially remove the audible gap between the segments that is present when conventional concatenation techniques are used. Coarticulation, and techniques for achieving it, are described further in conjunction with the figures and examples below. As a result of coarticulation, the audio message acquires a more natural and lifelike sound that is pleasing to the human ear.

Figure 2:
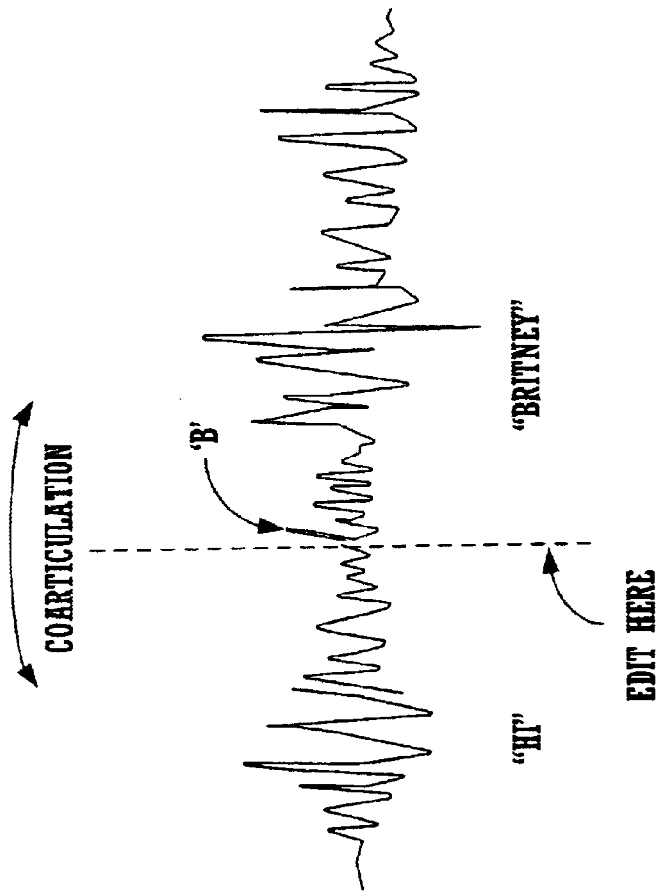
FIG. 2 is a representation of a waveform of a speech segment in accordance with the present invention.

FIG. 2 is a representation of a waveform 200 of a recorded speech segment in accordance with the present invention. Using the example introduced above, the spoken phrase "Hi Britney" is recorded, resulting in a waveform exemplified by waveform 200 (note that the actual waveform may be different that that illustrated by FIG. 2). Waveform 200 illustrates the coarticulation that occurs between the spoken word "Hi" and the spoken word "Britney" during normal speech. That is, even though two separate words are spoken, in actual human speech the first word flows (e.g., slurs) into the second word, generating an essentially continuous waveform.

Importantly, the end of the first spoken word can have acoustic properties or characteristics that depend on the phoneme of the following spoken word. In other words, the word "Hi" in "Hi Britney" will typically have a different acoustic characteristic than the word "Hi" in "Hi Chris," as the human mouth will take on one shape at the end of the word "Hi" in anticipation of forming the word "Britney" but will take on a different shape at the end of the word "Hi" in anticipation of forming the word "Chris." This characteristic is captured by the technique referred to herein as coarticulation.

The embodiments of the present invention capture this slurring although, as will be seen, the words in the first segment 110 of FIG. 1 (e.g., words such as "Hi") and the words in the second segment 120 of FIG. 1 (e.g., words such as "Britney") can be recorded and stored as separate speech segments (e.g., in different audio modules). To achieve this, according to one embodiment of the present invention, words that may be used in first segment 110 are each spoken and recorded in combination with each possible phoneme that may follow those words. These individual recordings are then edited to remove the phoneme utterance while leaving the coarticulation portion. The individual results are then stored in a database of voice segments.

The techniques employed in accordance with the various embodiments of the present invention are further described by way of example. With reference to FIG. 2, the spoken phrase "Hi Britney" is recorded. The point in waveform 200 at which the letter "B" of Britney is audibilized is identifiable. This point is indicated as point "B" in FIG. 2. This point can be verified as being correct by comparing waveform 200 to other waveforms for other names or words that begin with the letter "B."

In the present embodiment, the recording of the spoken phrase "Hi Britney" is then edited just prior to the point at which the letter "B" is audibilized. The edit point is also indicated in FIG. 2. In general, the editing is intended to retain the acoustic characteristics of the word "Hi" as it flows into the following word. In this way, a "Hi" suitable for use with any following word beginning with the letter "B" (equivalently, the phoneme of "B") is obtained and stored in the library (e.g., a database). A similar process is followed using the word "Hi" with each of the possible phonemes (alphabet-based and number-based, if appropriate) that may be used. The process is similarly extended to words (including numbers) other than "Hi." Databases are then generated that can be indexed by word and phoneme.

In addition, according to one embodiment, words that may be used in the second segment 120 (FIG. 1) are each separately spoken and recorded. These results are also stored in a database. It is not necessary to record a user interface prompt (e.g., a first segment 110 of FIG. 1) for each possible word that may be used as a bulk prompt (e.g., the second segment 120). Instead, it is only necessary to record a user interface prompt for each phoneme that is being used. As such, databases of user interface and bulk prompts can be recorded separately. Also, existing databases of bulk prompts can be used.

In one embodiment, the phonemes used are those standardized according to the International Phonetic Alphabet (IPA). According to one such embodiment, there are 40 possible phonemes for words and nine (9) possible phonemes for numbers. The phonemes for words and the phonemes for numbers that are used according to one embodiment of the present invention are summarized in Table 1 and Table 2, respectively. These tables can be readily adapted to include other phonemes as the need arises.

TABLE 1

| Exemplary Phonemes (Words) | | | | | | | |
|---|---|---|---|---|---|---|---|
| i | Ethan | * | America | S | Charlene (Shield) |
| I | Ingrid | p | Patrick | h | Herman |
| e | Abel | t | Thomas | v | Victor |
| E | Epsilon | k | Kenneth | D | The One |
| a | Andrew | b | Billy | z | Zachary |
| aj | Eisenhower | d | David | Z | Janeiro (Je suis) |
| Oj | Oiler | g | Graham | tS | Charles |
| O | Albright | m | Michael | dZ | George |
| u | Uhura | n | Nicole | j | Eugene |
| U | Ulrich | g~ | Nguyen | r | Rachel |
| o | O'Brien | f | Fredrick | w | William |
| A | Otto | T | Theodore | l | Leonard |
| aw | Auerbach | s | Steven | *r | Earl |
| ˆ | Other | | | | |

TABLE 2

| Exemplary Phonemes (Numbers) | |
|---|---|
| w | One |
| t | Two |
| T | Three |
| f | Four, Five |
| s | Six, Seven |
| e | Eight |
| z | Zero |
| E | Eleven |
| n | Nine |

It is recognized, for example, that the phoneme for the number one applies to the numbers one hundred, one thousand, etc. In addition, efficiencies in recording can be realized by recognizing that certain words may only be followed by a number. In such instances, it may be necessary to record a user interface prompt (e.g., first segment 110 of FIG. 1) for each of the 9 number phonemes only.

In one embodiment, the pitch (or prosody) of the recorded words is varied to provide additional context to concatenated speech. For example, when a string of numbers is recited, particularly a long string, it is a natural human tendency for the last numbers to be spoken at a lower pitch or intonation than the first numbers recited. The pitch of a word may vary depending on how it is used and where it appears in a message. Thus, according to an embodiment of the present invention, words and numbers can be recorded not just with the phonemes that may follow, but also considering that the phoneme that follows may be delivered at a lower pitch. In one embodiment, three different pitches are used. In such an embodiment, selected words and numbers are recorded not only with each possible phoneme, but also with each of the three pitches. Accordingly, an advantage of the present invention is that the proper speech segments can be selected not only according to the phoneme to follow, but also according to the context in which the segment is being used.

Another advantage of the present invention is that, as mentioned above, existing libraries of bulk prompts (e.g., speech segments that constitute segment 120 of FIG. 1) can be used. That is, it may only be necessary to record the speech segments that constitute the first speech segment (segment 110 of FIG. 1) in order to achieve coarticulation. For example, there can exist a library of all or nearly all of people's first names. According to one embodiment of the present invention, it is only necessary to record first speech segments (e.g., the user interface prompts such as the word "Hi") for each of the phonemes being used. The recorded user interface prompts can be concatenated and coarticulated with the existing library of people's names, as described further in the example of FIG. 3A.

Figure 3A:
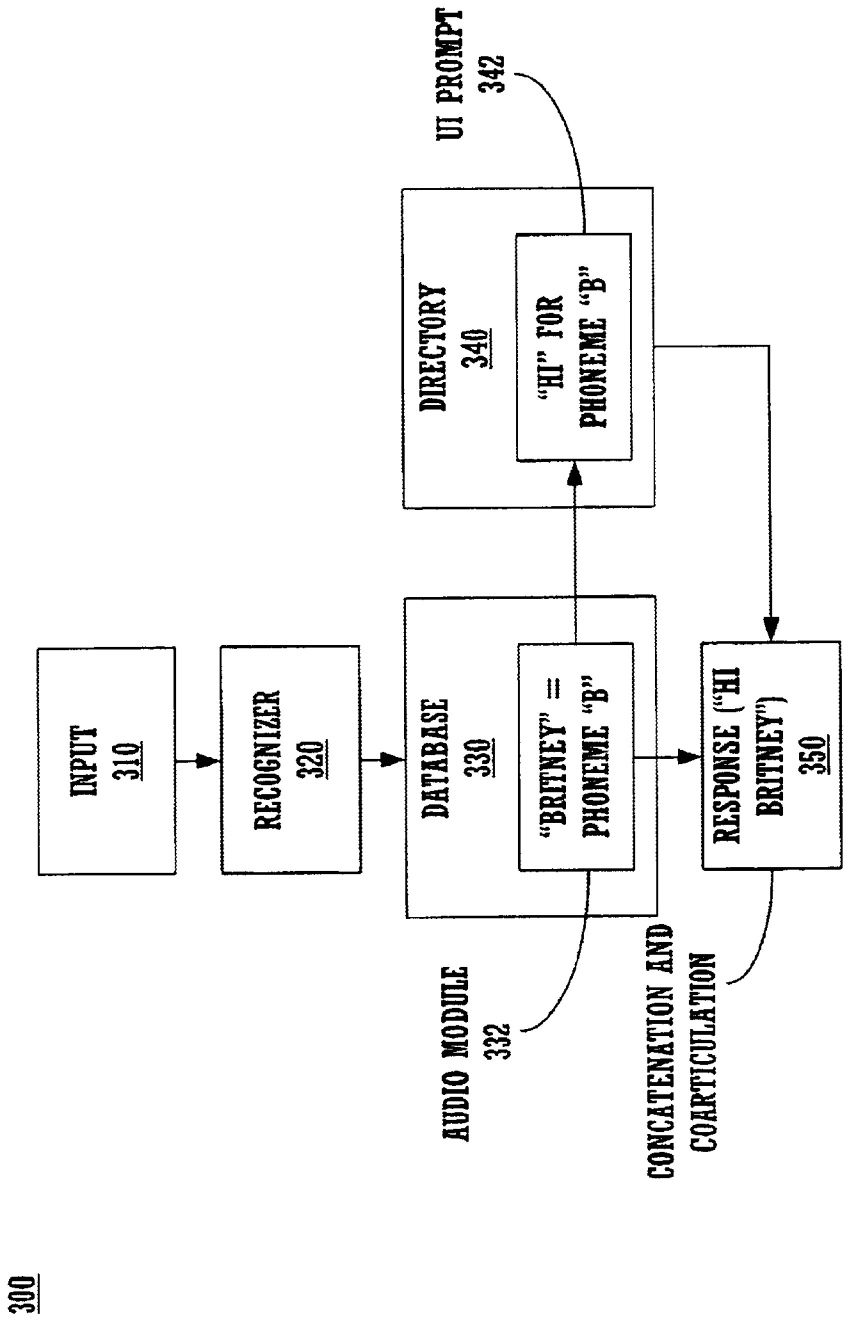
FIG. 3A is a data flow diagram of a method for rendering coarticulated, concatenated speech according to one embodiment of the present invention.

FIG. 3A is a data flow diagram 300 of a method for rendering coarticulated, concatenated speech according to one embodiment of the present invention. Diagram 300 is typically implemented on a computer system under control of a processor, such as the computer system exemplified by FIG. 3B.

Referring first to FIG. 3A, an audible input 310 is received into a block referred to herein as a recognizer 320. The audible input 310 can be received over a phone connection, for example. Recognizer 320 has the capability to recognize (e.g., understand) the audible input 310. Recognizer 320 can also associate input 310 with a phoneme corresponding to the first letter or first sound of input 310.

An audio module 332 (a bulk prompt) corresponding to input 310 is retrieved from database 330. From directory 340, another audio module (user interface prompt 342) corresponding to the phoneme associated with input 310 is selected. A naturally sounding response 350 is formed from concatenation and coarticulation of the user interface prompt 342 and the audio module 332. It is appreciated that database 330 and directory 340 can exist as a single entity (for example, refer to FIG. 5).

Data flow diagram 300 of FIG. 3A is further described by way of example. Typically, a call-in user will speak his or her name, or can be prompted to do so (this information can also be retrieved based on an authentication procedure carried out by the user). In this example, input 310 includes a name of a call-in user named Britney. The input 310 is recognized as the name Britney by recognizer 320. The audio module for the name Britney is located in database 330 and retrieved, and is also correlated to the phoneme for the letter "B" associated with the name Britney. From directory 340, an audio module for a selected user input prompt (e.g., "Hi") that corresponds to the phoneme for the letter "B" is located and retrieved. A response 350 of "Hi Britney" is concatenated from the audio module "Hi" from directory 340 and the audio module "Britney" from database 330.

Figure 3B:
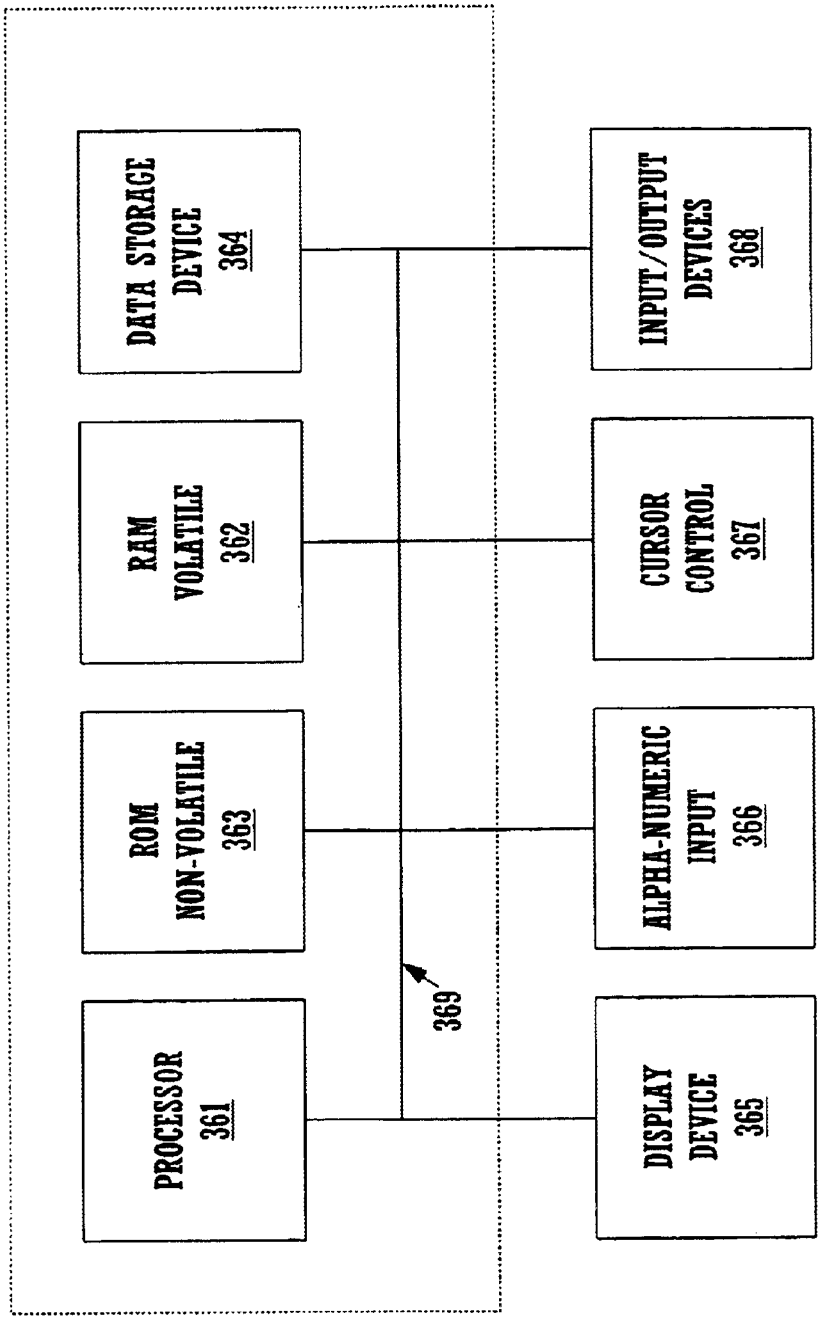
FIG. 3B is a block diagram of an exemplary computer system upon which embodiments of the present invention can be implemented.

Referring next to FIG. 3B, a block diagram of an exemplary computer system 360 upon which embodiments of the present invention can be implemented is shown. Other computer systems with differing configurations can also be used in place of computer system 360 within the scope of the present invention.

Computer system 360 includes an address/data bus 369 for communicating information, a central processor 361 coupled with bus 369 for processing information and instructions; a volatile memory unit 362 (e.g., random access memory [RAM], static RAM, dynamic RAM, etc.) coupled with bus 369 for storing information and instructions for central processor 361; and a non-volatile memory unit 363 (e.g., read only memory [ROM], programmable ROM, flash memory, EPROM, EEPROM, etc.) coupled with bus 369 for storing static information and Instructions for processor 361. Computer system 360 may also contain an optional display device 365 coupled to bus 369 for displaying information to the computer user. Moreover, computer system 360 also includes a data storage device 364 (e.g., a magnetic, electronic or optical disk drive) for storing information and instructions.

Also included in computer system 360 is an optional alphanumeric input device 366. Device 366 can communicate information and command selections to central processor 361. Computer system 360 also includes an optional cursor control or directing device 367 coupled to bus 369 for communicating user input information and command selections to central processor 361. Computer system 360 also includes signal communication interface (input/output device) 368, which is also coupled to bus 369, and can be a serial port. Communication interface 368 may also include wireless communication mechanisms.

Figure 4A:
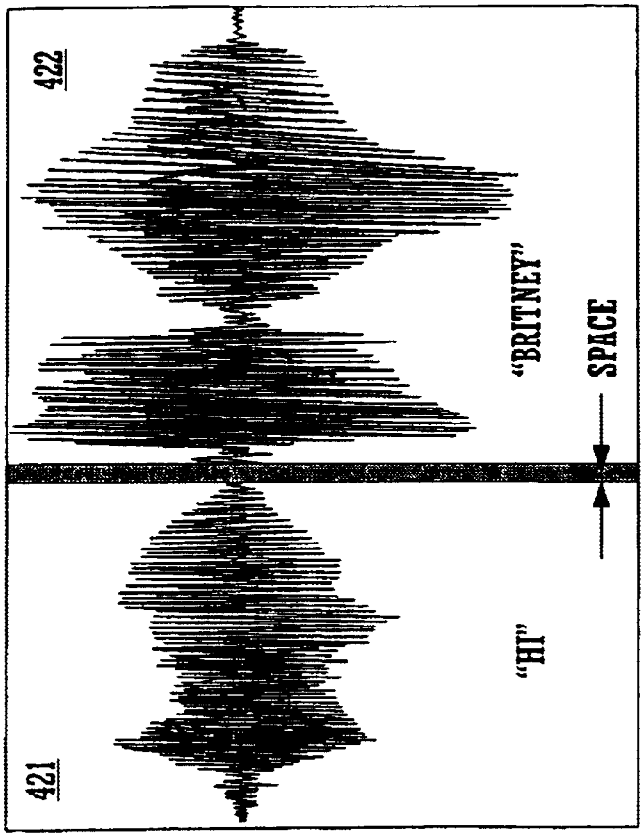
FIG. 4A is an example of a waveform of concatenated speech segments according to the prior art.
Figure 4B:
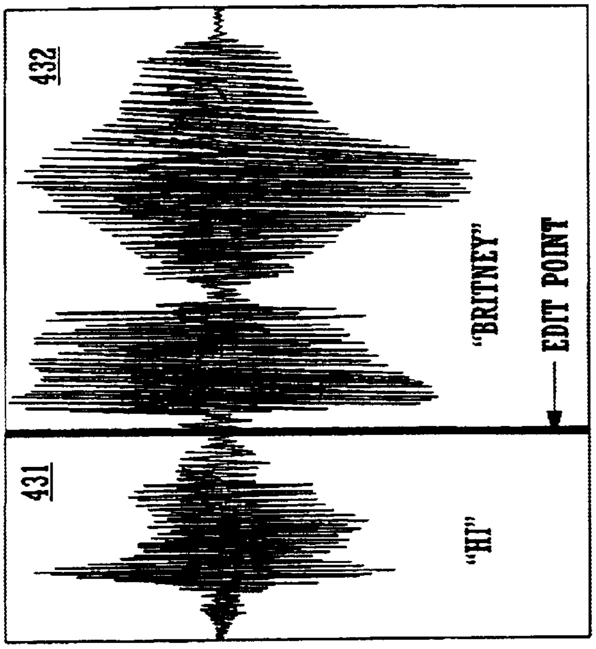
FIG. 4B is an example of coarticulated and concatenated speech segments according to one embodiment of the present invention.

FIG. 4A is an example of a waveform 420 of concatenated speech segments 421 and 422 according to the prior art. FIG. 4B shows a waveform 430 of coarticulated, concatenated speech segments 431 and 432 according to one embodiment of the present invention. Note that, in the example of FIGS. 4A and 4B, the audio modules for "Britney" (segments 422 and 432) are the same, but the audio modules for "Hi" (segments 421 and 431) are different.

As described above, the segment 431 is selected according to the particular phoneme that begins segment 432; therefore, segment 431 is in essence matched to "Britney" while the conventional segment 421 is not. Note also that, in prior art FIG. 4A, there is a space (in time) between the two segments 421 and 422. It is worth noting that even if the size of this space was to be reduced such that conventional segments 421 and 422 abutted each other, the resultant message would be choppier and not as natural sounding as the message realized from concatenating the coarticulated segments 431 and 432. The particular manner in which segment 431 is recorded and edited, as described previously herein, allows segment 431 to flow into segment 432; however, this slurring does not occur between conventional segments 421 and 422, regardless of how closely they are played together.

FIG. 5 is a representation of a database 500 comprising messages, phonemes, and pre-recorded voice segments according to one embodiment of the present invention. In the present embodiment, database 500 is used as described above in conjunction with FIG. 3A to render coarticulated and concatenated speech according to one embodiment of the present invention.

Database 500 of FIG. 5 indexes each message (e.g., user interface prompts 110 of FIG. 1) by message number. Message number 1, for example, may be "Hi," while message number 2, etc., are different user interface prompts. Each message number is associated with each of the possible phonemes. Each phoneme is also referenced using a phoneme number 1, 2, . . . , i, . . . , n. In one embodiment, n=40 for word-based phonemes and n=9 for number-based phonemes. Database 500 also includes pre-recorded voice segments 1, 2, 3, . . . , N (e.g., bulk prompts 120 of FIG. 1) that can also be indexed by their respective segment numbers. Thus, segment 1 may be "Britney," while segments 2, 3, . . . , N are different bulk prompts. Furthermore, as mentioned above, words and numbers can also be recorded at a variety of different pitches. Accordingly, database 500 can be expanded to include pre-recorded voice segments at different pitches.

Figure 6:
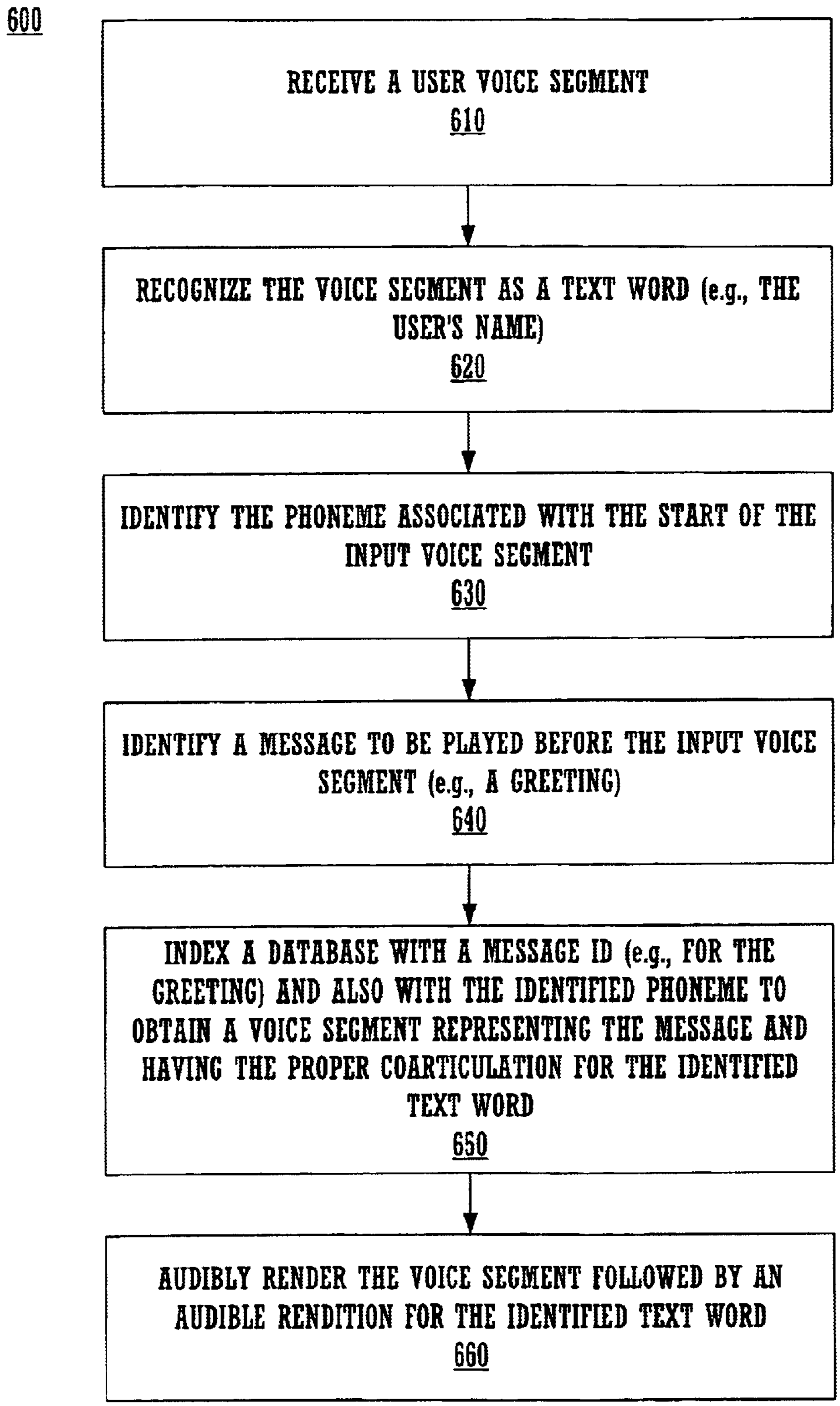
FIG. 6 is a flowchart of a computer-implemented method for rendering coarticulated and concatenated speech according to one embodiment of the present invention.

FIG. 6 is a flowchart 600 of a computer-implemented method for rendering coarticulated and concatenated speech according to one embodiment of the present invention. Although specific steps are disclosed in flowchart 600, such steps are exemplary. That is, embodiments of the present invention are well suited to performing various other steps or variations of the steps recited in flowchart 600. Certain steps recited in flowchart 600 may be repeated. All of, or a portion of, the methods described by flowchart 600 can be implemented using computer-readable and computer-executable instructions which reside, for example, in computer-usable media of a computer system or like device.

In step 610, a user input voice segment (e.g., input 310 of FIG. 3A) is received. The user input can be received using a phone-based application or a non-phone-based application. The user input is typically one or more spoken words. Alternatively, the user may input information using, for example, the touch-tone buttons on a telephone, and this information is translated into a voice segment (e.g., the user may input a personal identification number, which in turn causes the user's name to be retrieved from a database).

In step 620 of FIG. 6, the user input voice segment is recognized as a text word (e.g., the user's name). At some point, for example in response to step 610 or 620, the audio module corresponding to the voice segment (e.g., second segment or bulk prompt 120 of FIG. 1) can be retrieved from a database (e.g., database 330 of FIG. 3A).

In step 630 of FIG. 6, the phoneme associated with the start of the user input voice segment is identified. For example, if the voice segment is the name "Britney," then the phoneme for the sound of the letter "B" in Britney is identified.

In step 640, a message (e.g., first segment or user interface prompt 110 of FIG. 1) is identified (e.g., selected) from a directory of such messages (e.g., directory 340 of FIG. 3A). This message can be selected and changed depending on the type of interaction that is occurring with the user. Initially, for example, a greeting (e.g., "Hi") can be identified. As the interaction proceeds, different user interface prompts can be identified.

In step 650 of FIG. 6, a database (exemplified by database 500 of FIG. 5) is indexed with the message identified in step 640, and also with the phoneme identified in step 630. Accordingly, a voice segment representing the message and having the proper coarticulation associated with the user input voice segment (e.g., the text word of step 620) is selected. In addition, in one embodiment, the database is also indexed according to different pitches, and in that case a message also having the proper pitch is selected.

In step 660 of FIG. 6, the selected user interface voice segment (from step 650) is concatenated with the bulk prompt voice segment (from step 610 or 620, for example) and audibly rendered. The segments so rendered will be coarticulated, such that the first segment flows naturally into the second segment.

In summary, embodiments of the present invention improve the sound of concatenated, recorded speech by also coarticulating the recorded speech. The resulting message is smooth, natural sounding and lifelike. Existing is libraries of regularly recorded bulk prompts can be used by coarticulating the user interface prompt occurring just before the bulk prompt. Embodiments of the present invention can be used for a variety of voice applications including phone-based applications as well as non-phone-based applications.

Embodiments of the present invention have been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of rendering an audio signal comprising:

identifying a first word;

identifying a first phoneme corresponding to said first word;

based on said first phoneme, selecting a first voice segment of a plurality of stored and pre-recorded voice segments wherein said first voice segment corresponds to said first phoneme, wherein each of said plurality of stored and pre-recorded voice segments represents a respective audible rendition of a same word that was recorded from a respective utterance in which a respective phoneme is uttered just after said respective audible rendition of said same word;

playing said first voice segment followed by an audible representation of said first word;

identifying a second word;

identifying a second phoneme corresponding to said second word;

based on said second phoneme, selecting a second voice segment of said plurality of stored and pre-recorded voice segments wherein said second voice segment corresponds to said second phoneme; and playing said second voice segment followed by an audible representation of said second word.

2. A method as described in claim 1 wherein said identifying a phoneme is performed using a database relating words to phonemes.

3. A method as described in claim 1 wherein said first and second words are different names and wherein said same word is a greeting.

4. A method as described in claim 1 wherein said selecting is performed using a database comprising said plurality of stored and pre-recorded voice segments which are indexed based on phoneme and based on word.

5. A method as described in claim 4 wherein said database further comprises stored and pre-recorded voice segments at different pitches, wherein said plurality of stored and pre-recorded voice segments are indexed based on pitch.

6. A method of rendering an audio signal comprising:

identifying a first word;

identifying a first phoneme corresponding to said first word;

based on said first phoneme, selecting a first voice segment of a plurality of stored and pre-recorded voice segments wherein said first voice segment corresponds to said first phoneme, wherein each of said plurality of stored and pre-recorded voice segments represents a respective audible rendition of a same message that was recorded from a respective utterance in which a respective phoneme is uttered just after said respective audible rendition of said same message;

playing said first voice segment followed by an audible representation of said first word;

identifying a second word;

identifying a second phoneme corresponding to said second word;

based on said second phoneme, selecting a second voice segment of said plurality of stored and pre-recorded voice segments wherein said second voice segment corresponds to said second phoneme; and playing said second voice segment followed by an audible representation of said second word.

7. A method as described in claim 6 wherein said identifying a phoneme is performed using a database relating words to phonemes.

8. A method as described in claim 6 wherein said first and second words are different names and wherein said same message is a greeting.

9. A method as described in claim 6 wherein said first and second words are numbers and wherein said same message is a number.

10. A method as described in claim 6 wherein said selecting is performed using a database comprising said plurality of stored and pre-recorded voice segments which are indexed based on phoneme and based on message.

11. A method as described in claim 10 wherein said database further comprises stored and pre-recorded voice segments at different pitches, wherein said plurality of stored and pre-recorded voice segments are indexed based on pitch.

12. A computer system comprising a bus coupled to memory and a processor coupled to said bus wherein said memory contains instructions for implementing a computerized method of rendering an audio signal comprising:

identifying a word;

identifying a phoneme corresponding to said word;

based on said phoneme, selecting a particular voice segment of a plurality of stored and pre-recorded voice segments wherein said particular voice segment corresponds to said phoneme, wherein each of said plurality of stored and pre-recorded voice segments represents a respective audible rendition of a same word that was recorded from a respective utterance in which a respective phoneme is uttered just after said respective audible rendition of said same word; and playing said particular voice segment followed by an audible rendition of said word.

13. A computer system as described in claim 12 wherein said identifying a phoneme is performed using a database relating words to phonemes.

14. A computer system as described in claim 12 wherein said word is a name and wherein said same word is a greeting.

15. A computer system as described in claim 12 wherein said word is a number and wherein said same word is a number.

16. A computer system as described in claim 12 wherein said selecting is performed using a database comprising said plurality of stored and pre-recorded voice segments which are indexed based on said phoneme and based on said word.

17. A computer system as described in claim 16 wherein said database further comprises stored and pre-recorded voice segments at different pitches, wherein said plurality of stored and pre-recorded voice segments are indexed based on pitch.

18. A computer system comprising a bus coupled to memory and a processor coupled to said bus wherein said memory contains instructions for implementing a computerized method of rendering an audio signal comprising:

identifying a first word;

identifying a first phoneme corresponding to said first word;

based on said first phoneme, selecting a first voice segment of a plurality of stored and pre-recorded voice segments wherein said first voice segment corresponds to said first phoneme, wherein each of said plurality of stored and pre-recorded voice segments represents a respective audible rendition of a same message that was recorded from a respective utterance in which a respective phoneme is uttered just after said respective audible rendition of said same message;

playing said first voice segment followed by an audible representation of said first word;

identifying a second word;

identifying a second phoneme corresponding to said second word;

based on said second phoneme, selecting a second voice segment of said plurality of stored and pre-recorded voice segments wherein said second voice segment corresponds to said second phoneme; and playing said second voice segment followed by an audible representation of said second word.

19. A computer system as described in claim 18 wherein said identifying a phoneme is performed using a database relating words to phonemes.

20. A computer system as described in claim 18 wherein said first and second words are different names and wherein said same message is a greeting.

21. A computer system as described in claim 18 wherein said first and second words are numbers and wherein said same message is a number.

22. A computer system as described in claim 18 wherein said selecting is performed using a database comprising said plurality of stored and pre-recorded voice segments which are indexed based on phoneme and based on message.

23. A computer system as described in claim 22 wherein said database further comprises stored and pre-recorded voice segments at different pitches, wherein said plurality of stored and pre-recorded voice segments are indexed based on pitch.

24. A method of rendering an audible signal comprising:

receiving a first voice input from a first user;

recognizing said first voice input as a first word;

translating said first word into a corresponding first phoneme representing an initial portion of said first word;

using said first phoneme, indexing a database to select a first voice segment corresponding to said first phoneme, wherein said database comprises a plurality of recorded voice segments and wherein each recorded voice segment represents a respective audible rendition of a same word that was recorded from a respective utterance in which a respective phoneme is uttered just after said respective audible rendition of said same word;

playing said first voice segment followed by an audible rendition of said first word;

receiving second voice input from a second user;

recognizing said second voice input as a second word;

translating said second word into a corresponding second phoneme representing an initial portion of said second word;

using said second phoneme, indexing said database to select a second voice segment corresponding to said second phoneme; and playing said second voice segment followed by an audible rendition of said second word.

25. A method as described in claim 24 wherein said playing is performed over a telephone.

26. A method as described in claim 24 wherein said first word and said second word are names.

27. A method as described in claim 26 wherein said same word is a greeting.

* * * * *